D. E. Teal,
Windlass Water Elevator,
N°23,275. Patented Mar. 15, 1859.
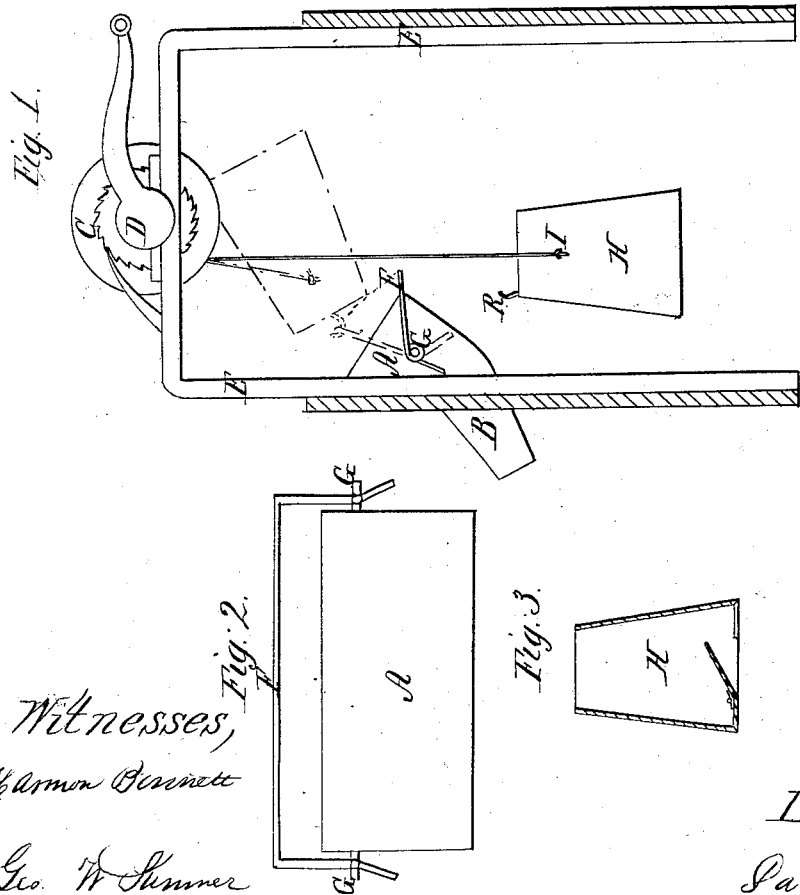
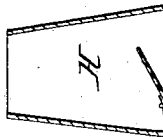
Witnesses,
Harmon Bennett
Geo. W. Sumner
Inventor,
Daniel E Teal

UNITED STATES PATENT OFFICE.

DANIEL E. TEAL, OF NORWICH, NEW YORK.

DEVICE FOR RAISING WATER.

Specification of Letters Patent No. 23,275, dated March 15, 1859.

*To all whom it may concern:*

Be it known that I, DANIEL E. TEAL, of Norwich, in the county of Chenango and State of New York, have invented certain new and useful Improvements in Boxes of Well-Curbs and in Well-Buckets; and I do hereby declare that the following is a full and exact description of the same, reference being had to the accompanying drawings and to the letters and marks thereon.

My improvements are designed to facilitate the delivery of the water from the bucket, and relate to the manner of suspending the bucket in connection with the means for the delivery of the water from the bucket by the continued upward movement of the bucket.

Of the drawings forming part of this specification Figure 1, is a view of the well-curb, box, spout, bucket and windlass, the parts being shown in section; Fig. 2, being a view of the box and its bail; and Fig. 3 a view of the bucket.

The box (A) and its spout (B) are made of cast-iron and in one piece and are attached to the curb (E) by any ordinary means, the front part of the box fitting against the side of the curb. To the box is attached a bail (F) which is suspended on pins (G, G) upon which it turns freely. The bracket (H) has a flap valve in its bottom, so that the water will flow into it on its being lowered through the water, and is suspended from the windlass (D) by a rope or chain which branches off, one branch going to each side of the bucket as indicated at (I). There are hooks (K) upon the edge of the bucket for catching the bail of the box as the bucket is drawn up. The windlass has a crank and pawl and ratchet or toothed wheel as shown by the drawing.

It will readily be seen how the parts here named are operated.

Supposing the bucket to be down and filled with water and the windlass to be turned in the direction for elevating the bucket, as it comes upward the rope or chain branching to both sides will guide and bring one of the hooks (K) in contact with the bail (F) of the box and the continued turning of the windless will move upward the bucket and the bail together and the water be turned out of the bucket without the use of any other means. The emptying position of the bucket is shown in red lines in Fig. 1. On reversing the motion of the windlass it will, also, be seen the bucket is loosened from the bail,—the windlass being the only means used for all the movements of the bucket upward and downward. The guiding of the bucket to a central position in relation to the bail of the box is performed by flanges (C) upon collars fitted onto the windlass. These collars are adjustable and can be placed nearer to or farther from each other, as may be necessary to adapt them to the branches of the rope or chain, and to guide the bucket to such part of the bail and box as may be desirable.

Instead of the ropes or chains here named a band of suitable material may be used, it being attached to the ordinary bail of a bucket, and the flanges can then be adjusted to suit the width of the band.

Having thus set out my invention what I claim as new and desire to secure by Letters Patent is—

The arrangement of means herein recited, the same consisting of the rope or chains, the hooks (K); bail (F) of the cast-iron box; adjustable flanged-collars on the windlass, and the windlass, whereby the bucket can be lowered, filled with water, raised and emptied by merely turning the windlass as described.

DANIEL E. TEAL.

Attest:
HARMAN BENNETT,
FRANCIS U. GARATT.